(12) United States Patent
Tillman et al.

(10) Patent No.: US 6,334,753 B1
(45) Date of Patent: Jan. 1, 2002

(54) STREAMLINED BODIES WITH COUNTER-FLOW FLUID INJECTION

(75) Inventors: Thomas G. Tillman, West Hartford; Brian E. Wake, Portland, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/629,580

(22) Filed: Jul. 31, 2000

(51) Int. Cl.[7] .............................................. F01D 25/24
(52) U.S. Cl. ........................ 415/1; 415/914; 416/231 R; 416/232
(58) Field of Search ................................. 415/914, 115, 415/150, 1; 416/232, 231 R; 244/204, 206, 207, 214, 198

(56) References Cited

U.S. PATENT DOCUMENTS 6,203,269 B1 * 3/2001 Lorber et al. ................ 415/115

OTHER PUBLICATIONS

1. Luc Robillard, "On the Plane Counterflowing Wall Jet", Proceedings of the Fourth Canadian Congress of Applied Mechanics, Montreal, May 28, 1973 through Jun. 1st, 1973, pp. 739–740.

2. Dieter Bohn and Karsten Kusterer, "Blowing Ratio Influence on Jet Mixing Flow Phenomena at the Leading Edge", AIAA 99–0670, 37th AIAA Aerospace Sciences Meeting and Exhibit, Jan. 11–14, 1999, Reno, NV.

3. Dr. Hermann Schlichting, "Boundary–Layer Theory", Seventh Edition, McGraw-Hill Book Company, 1979. pp. 380–381 and pp. 689–692.

4. Balachander, Robillard, and Ramamurthy, "Some Characteristics of Counter Flowing Wall Jets", Transactions of the ASME, vol. 114, Dec. 1992, pp. 554–558.

* cited by examiner

*Primary Examiner*—Edward K. Look
*Assistant Examiner*—Richard Edgar
(74) *Attorney, Agent, or Firm*—Stephen E. Revis

(57) ABSTRACT

A streamlined body has oppositely facing external pressure and suction surfaces that meet to form a leading edge region. Passageways within the body direct pressurized fluid from passageway outlets over the pressure surface toward the leading edge region at a shallow angle with respect to the pressure surface. The pressurized fluid travels around the leading edge region to the suction surface, energizing the boundary layer on the suction surface.

20 Claims, 7 Drawing Sheets

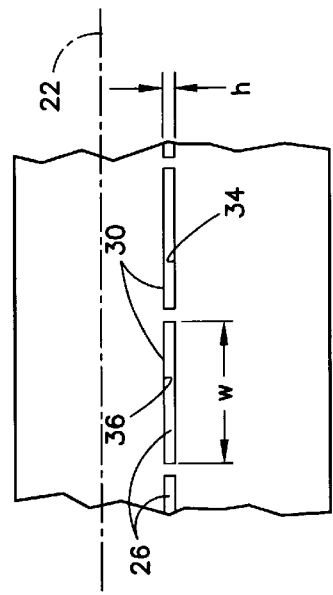
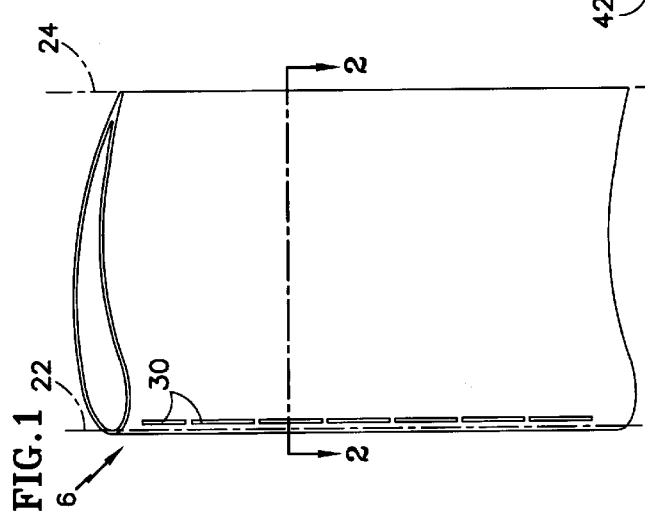
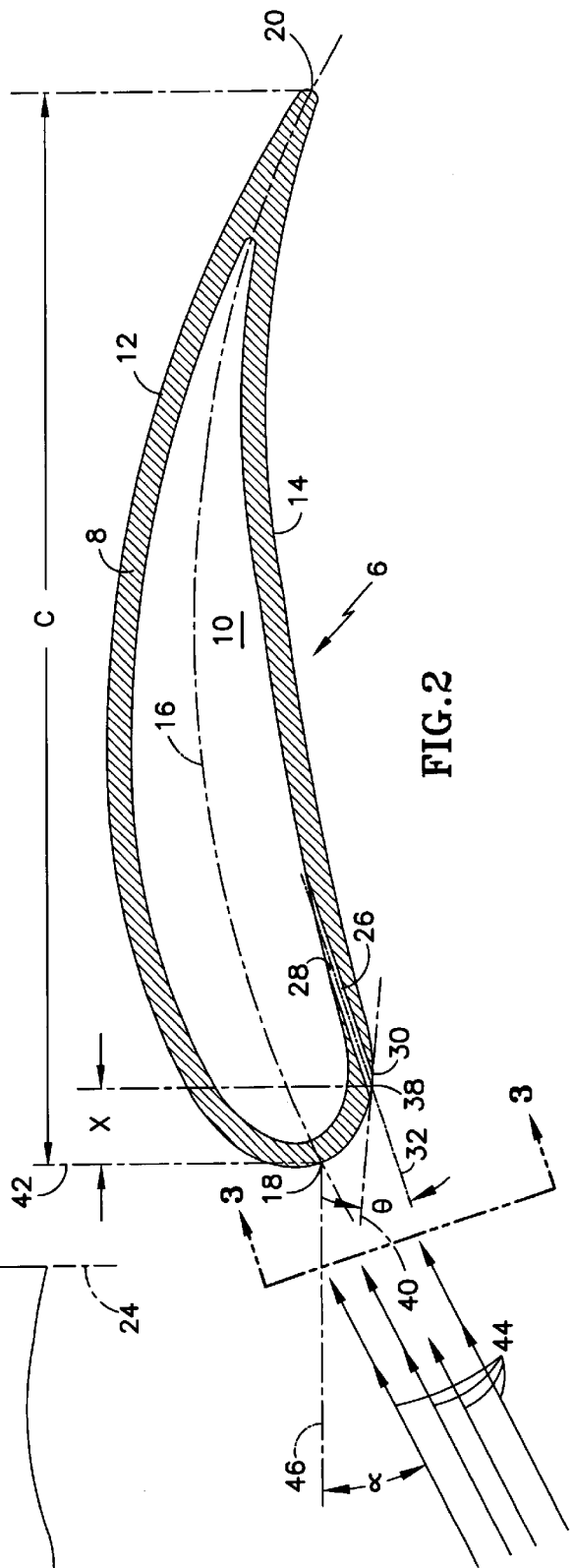

STREAMLINED BODIES WITH COUNTER-FLOW FLUID INJECTION

BACKGROUND OF THE INVENTION

1. Technical Field

This invention relates to streamlined bodies with airfoil shaped cross sections.

2. Background Art

Bodies with a streamlined shape are used within a moving fluid for several reasons, including, but not limited to one or more of the following: to reduce losses as a result of drag; to minimize turbulence created downstream; and to create or increase lift (such as in the case of an airplane wing). Streamlined bodies having airfoil shaped cross-sections are the most common.

In this specification and the appended claims, a body having an "airfoil" shaped cross-section means any elongated, streamlined body that, when placed within a fluid moving downstream relative to the body, the body will have a pressure surface and a suction surface; and those surfaces join together to form a leading edge region and a trailing edge region. The surface which is the pressure surface and the surface which is the suction surface is determined by the angle of incidence of the bulk flow on the body. Typically, a body is designed to have one of the surfaces always perform as a suction surface, and the other always perform as a pressure surface; however there are some applications for which the roles of these surfaces become reversed during a portion of the operating regime.

Much work has been done over the years to increase the effectiveness of bodies having airfoil shaped cross-sections. For example, considerable effort has gone into delaying boundary layer separation from the suction surface for the purpose of reducing drag, to increase lift, to delay the onset of stall (i.e. to accommodate higher angles of incidence of the flow against the leading edge), and for generally giving the airfoil the ability to perform better over a wider range of flow conditions.

One common and successful method used to achieve these goals has been slot blowing. Slot blowing according to the prior art is the injection of pressurized fluid from within the body along the suction surface at a point just upstream of where separation is normally expected to occur. The fluid is injected from appropriately shaped slots oriented to direct the fluid in a downstream direction substantially parallel to or at a low angle to the surface. Slot blowing adds momentum to the near-wall flow, increasing the boundary layer near-wall energy thereby allowing the boundary layer to remain attached to the surface beyond the point where separation would have occurred without the blowing. Prior art slot blowing is discussed in more detail in the paper AIAA 98-0214, *Oscillatory Control of Separation at High Reynolds Numbers*, by A. Seifert and L. G. Pack.

A drawback of downstream slot blowing is the relatively high rate of fluid injection needed to have the desired impact on boundary layer separation. The use of pressurized fluid for the downstream slot blowing entails a cost, since energy needs to be expended to pressurize the fluid. As a result, for some applications, downstream slot blowing is impractical or must be limited in order that the costs of blowing do not outweigh the benefits.

BRIEF SUMMARY OF THE INVENTION

According to the present invention, a streamlined body having a leading edge region includes passageways within the body for directing pressurized fluid from within the body over the external surface of the body at a shallow angle with respect to the external surface and toward the leading edge region. According to an exemplary embodiment of the present invention, a streamlined body has a surface that is the pressure surface during at least a portion of its operation in its intended environment. Passageways within the body have their outlets at the pressure surface and are located and oriented to inject pressurized fluid upstream over the pressure surface at a shallow angle to the pressure surface toward the leading edge region. The passageway outlets are sufficiently close to the leading edge region and the angle of injection is sufficiently shallow that substantially all the injected fluid travels along the pressure surface and around the leading edge region to the suction surface, energizing the boundary layer on the suction surface.

Injecting the flow in an upstream direction over the pressure surface allows several beneficial phenomena to take place, which do not occur with prior art downstream slot blowing over the suction surface. First, the shear layer between the injected flow and the freestream flow has a longer development path than with downstream slot blowing before reaching the point on the suction surface where separation would normally occur. In other words, in the present invention, for the injected fluid to travel from the passageway outlets to the aforementioned normally occurring separation point, it must travel further than fluid injected downstream in accordance with the prior art. This gives energetic, large-scale turbulence structures more distance to develop. Additional energetic turbulence provides enhanced entrainment of the freestream flow on the suction surface, thereby delaying (to a point further downstream) or eliminating separation.

Second, the injected fluid accelerates around the leading edge region, thereby increasing its momentum and kinetic energy, which enables the boundary layer to remain attached to the suction surface for a longer distance than it would without this aceleration.

Third, the injected fluid, as it travels around the leading edge region of the body, creates a "virtual shape" around the leading edge region, effectively making the leading edge region operate as though it were thicker. Thickening the leading edge region of an airfoil is a well-known approach for reducing, delaying or eliminating the boundary layer separation and stall experienced by an airfoil at higher angles of attack. The present invention provides the benefits of a thicker leading edge region without actually adding thickness and weight. In the alternative, a streamlined body incorporating the features of the present invention may be made thinner without incurring separation related performance losses.

As a result of the foregoing phenomena, the present invention, using a lower rate of fluid injection (usually accompanied by lower pressure, as well) provides benefits similar to and even better than those achieved with prior art downstream slot blowing. Alternatively, significantly improved performance (e.g., greater lift, greater stall margin, and less drag) may be obtained with the present invention using the same rates of fluid injection as used by the prior art.

In one embodiment of the present invention, a streamlined body having an airfoil shaped cross-section has one or more passageways therein communicating with a source of pressurized fluid. The passageways have their outlets on the pressure surface a short distance downstream from the leading edge line; and the passageways are oriented to direct the pressurized fluid toward the leading edge line at a shallow angle with respect to the pressure surface at the passageway outlet.

The "leading edge line", as that phrase is used herein, is the span-wise locus of points formed by the intersection of the mean camber lines of the airfoil shaped cross-sections with the leading edge region. To optimize the benefits of the invention, the flow losses within the passageways should be minimized and the minimum amount of pressurized fluid required to obtain a desired result should be used. For this reason the passageways are preferably slots, elongated in the direction of the leading edge line to provide wide coverage of the injected fluid over the length of the leading edge region, and ultimately over the suction surface. Elongated slots have lower flow losses than, for example, a series of holes of circular cross-section providing the same mass flow rate over the same length of leading edge region.

In order to realize the benefits of the present invention the passageway outlets cannot be so far downstream of the leading edge line that an excessive amount of the injected fluid is unable to remain attached to the pressure surface as it moves toward and around the leading edge region to the suction surface. As the passageway outlets are moved further from the leading edge line, larger quantities of blowing fluid and/or higher pressure fluid may be required to compensate for fluid lost to the free stream or bulk fluid flow. At some distance downstream it will become impractical and/or impossible to have a sufficient amount of the injected fluid remain attached to the pressure surface until it travels around past the leading edge line to the suction surface. Generally, a good slot outlet location is near the stagnation point. This may turn out to be just in front of or just behind where the stagnation point would be located without slot blowing. Upon the initiation of slot blowing toward the leading edge line, the stagnation point will move (from its location without blowing) whenever separation on the suction surface is delayed. In some circumstances, it may move from in front of the slot outlet to behind the slot outlet.

If slots are used for the passageways, they may be formed in any number of ways. The simplest slot is perhaps a straight passageway of rectangular cross-section through the wall of the streamlined body, which is normally a hollow body. A vector representing the direction of flow from the slot should form a shallow angle with respect to the surface. Any number of passageway designs may be used to make that angle as small as possible. Several such designs are described below in the "Best Mode for Carrying Out the Invention".

Without intending to limit the same, the present invention is particularly useful in connection with compressor and turbine rotor blades and fixed turning vanes, helicopter blades, aircraft wings, nacelles, aircraft and engine struts, and aerodynamically contoured control surfaces, such as aircraft horizontal and vertical stabilizers and flaps. All of these are considered streamlined bodies having airfoil shaped cross-sections since, during use, the external surfaces become pressure and suction surfaces. Nacelles, for example, such as those surrounding aircraft engines, are typically defined by rotating a planar airfoil shape around a downstream extending axis. Rather than to create lift, nacelles are designed to reduce drag and to minimize or reduce distortion of the air entering the engine under a variety of operating conditions. The present invention is particularly useful for reducing or minimizing distortion during high angles of attack and when there are cross winds, as is explained more fully below.

The foregoing features and advantages of the present invention will become more apparent in light of the following detailed description of exemplary embodiments thereof as illustrated in the accompanying drawings.

BRIEF DESCRIPTION OF THE DRAWINGS

FIG. 1 is a perspective view of a hollow airfoil incorporating the blowing slots of the present invention.

FIG. 2 is a sectional view taken along the line 2—2 of FIG. 1.

FIG. 3 is a view of the airfoil of FIG. 1 taken in the direction 3—3 of FIG. 2.

DETAILED DESCRIPTION OF THE INVENTION

Figure 4:
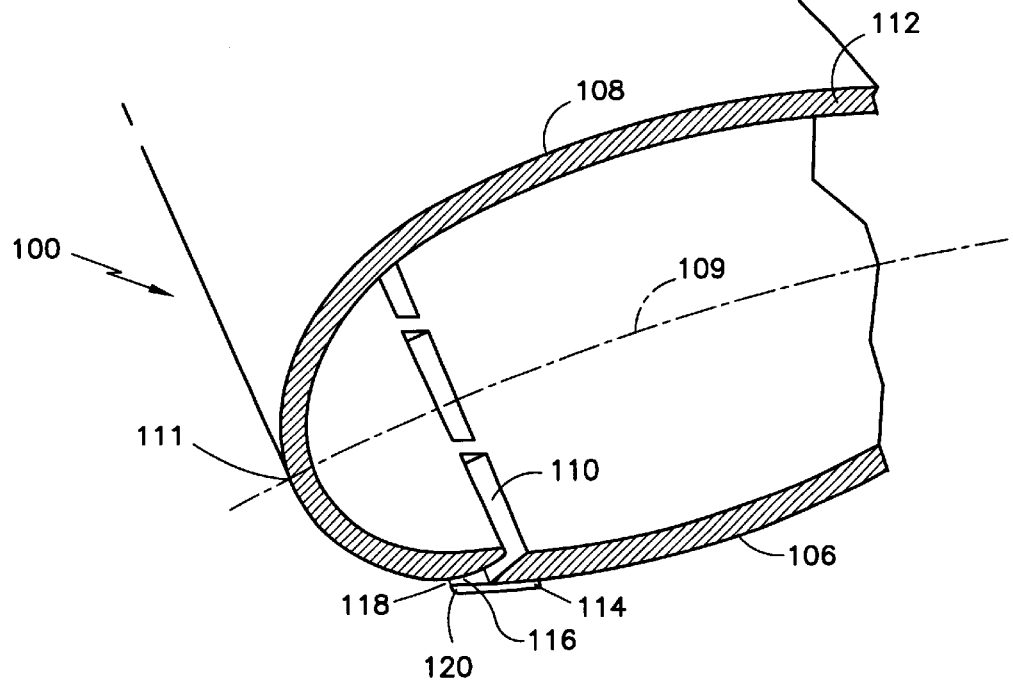
FIG. 4 is a sectional view representing a portion of an airfoil used for testing the present invention, showing the slot configuration used in the tests.

Referring to FIG. 1, a hollow airfoil 6 is shown, such as might be used as a stationary vane in a gas turbine engine. The airfoil 6 is only one example of a streamlined body, which may use the features of the present invention.

As best shown in FIG. 2, the airfoil 6 has a thin wall 8 having an external airfoil shaped cross-section that, in this example, happens to be a constant cross-section over the length or "span" of the airfoil, although that is not a requirement of the present invention. The wall 8 defines an internal cavity 10 of the airfoil. The airfoil includes a suction surface 12 and a pressure surface 14. A mean camber line 16 of the airfoil cross-section intersects the external surface of the airfoil at a point 18 on the leading edge region and at the point 20 on the trailing edge region. The mean chord length of the airfoil at any cross-section along the span of the airfoil is the straight line distance "c" between the leading edge point 18 and trailing edge point 20. The spanwise locus of leading edge points 18 on the airfoil cross-sections along the span of the airfoil 6 define the airfoil leading edge line 22 (FIGS. 1 and 3). Similarly, the spanwise locus of trailing edge points 20 defines a trailing edge line 24 (FIG. 1). For purposes of this application and the appended claims, the suction surface 12 and the pressure surface 14 meet along the leading and trailing edge lines.

With reference to FIGS. 2 and 3, the airfoil 6 includes a plurality of slots 26 through the airfoil wall 8. Each slot has an inlet 28, open to the cavity 10, and an outlet 30 at the pressure surface 14. The slot outlets extend parallel to the leading edge line along the length of the airfoil; and although in this embodiment a plurality of slots are used to ensure the structural integrity of the airfoil, a single, long slot would work as well. The slots are configured and oriented to inject fluid over the pressure surface toward the leading edge line 22, around the leading edge region to the suction surface. Although the slots are straight in FIG. 2, they could be curved to help direct the pressurize fluid at a more shallow angle to the pressure surface.

During operation the cavity 10 is pressurized with a fluid, such as air. The pressurized fluid leaves the slot outlets in the direction represented by the imaginary line 32, which is equidistant from the upper and lower slot surfaces 34, 36, respectively. The line 32 intersects the pressure surface 14 at a point 38. (If the slot were curved, the line 32 would be similarly curved and equidistant from the surfaces 34,36.) The line 40 is a line tangent to the pressure surface 14 at the point 38. "θ" is the angle formed between the tangent line 40 and the direction of flow of pressurized fluid from the slot outlet. The line 42 passes through the leading edge point 18 and is perpendicular to a straight line (the mean chord line, not drawn in this Figure) connecting points 18 and 20. The distance "x" from the point 38 to a line 42 is the distance of the slot outlet from the leading edge point. "w" is the spanwise width of the slot at the outlet; and "h" is the height of the slot at the outlet, as measured in a plane perpendicular to the direction 32. (FIG. 3 is a view in the direction 32.) The arrows 44 represent the direction of bulk fluid flow relative to the airfoil. The angle "α", between the direction of bulk fluid flow 44 and a line 46 parallel to the mean chord line, is the angle of incidence of the flow relative to the airfoil 10 at the location of the cross-section (α is also known as the "angle of attack").

As discussed above, best results are realized when substantially all the fluid exiting from the slots 26 remains attached to the pressure surface and travels around the leading edge region, past the leading edge point and on to the suction surface. For this reason the angle θ should be no greater than about 30° and preferably no greater than 20°, with 0° being best. The slot outlet may be located either upstream or downstream of the stagnation point. During blowing, if the slot outlet is downstream of the stagnation point, the stagnation point is located off the airfoil surface, on the virtual surface created by the injected fluid.

Another parameter that may be used to locate the slot outlet is the ratio x/c. Acceptable results should be obtained when the ratio x/c (expressed as a percent) is between 0.25% and 5.0%. Preferably, the ratio should be between 0.5% and 3.0%. For example, if c=17.0 inches, the preferred values for x would be from 0.085 inch and 0.51 inch.

It is important that the injected fluid has high momentum near the surface of the airfoil and that a minimum amount of the fluid is mixed out into the free stream fluid prior to reaching the suction surface. Slot design plays a roll in achieving that goal. If the slot height h is too high, a greater percentage of the fluid will be injected further from the airfoil surface and is more likely to be lost to the free stream flow rather than to travel around the leading edge region to the suction surface. Furthermore, the injected fluid located further from the wall surface is less effective in energizing the near-wall portion of the boundary layer, its most critical region. Thus, if a higher flow rate is needed to assure that sufficient fluid reaches the suction surface, it may be preferable to increase the fluid pressure rather than the slot height. Another consideration relating to slot design is to keep pressure losses within the slots to a minimum while still achieving the objectives of the invention. It is believed that the ratio of slot width to slot height (w/h) should be between 5 and 500 and preferably between 15 and 150.

One of the major benefits of the present invention is the ability to improve airfoil performance using lower fluid pressures than compared to prior art downstream blowing on the suction surface. In accordance with the present invention, it is believed that improved performance may be obtained with a ratio of supply fluid pressure to free stream static pressure of between 1.05 and 1.50, with a range of from 1.1 to 1.3 being most preferred. This compares to pressure ratios in excess of 1.5 usually needed to achieve comparable results with conventional downstream blowing on the suction surface.

Several parameters which are useful for understanding the benefits provided by the present invention and for comparing prior art slot blowing to the present invention are the lift coefficient; the momentum coefficient $C_\mu$ (or "blowing coefficient"); the ratio of blowing fluid supply total pressure ($P_s$) to free stream total pressure ($P_o$); and the angle of attack α (see FIG. 2). The lift coefficient is directly proportional to the amount of lift created by a body, such as the airfoil 10 of FIG. 1. The momentum coefficient $C_\mu$ is directly proportional to the momentum flow rate of blowing fluid and is defined as follows:

$$C_\mu = (\rho_s U_s^2 h)/(\rho_0 U_0^2 c)$$

where $\rho_s$ is slot fluid density, $\rho_0$ is the freestream fluid density, $U_s$ is the slot fluid velocity, $U_0$ is the freestream velocity, h is the slot height, and c is the airfoil chord length.

FIG. 4 depicts the upstream portion (including the leading edge region) of one spanwise cross-section of an airfoil 100 that was tested in a wind tunnel to demonstrate the benefits of the present invention. The test airfoil was a section of an actual commercial helicopter blade having a pressure surface 106, a suction surface 108, a mean camber line 109, and leading edge point 111. It had a constant spanwise cross-section with a mean chord length c of 17 inches, and a maximum thickness (measured perpendicular to the mean chord line) of 1.53 inches..

The helicopter airfoil section used in the test was modified by adding slots in accordance with the present invention. For this test, passageways 110 similar to the slots 26 shown in FIG. 2 were machined through the airfoil wall 112. A flat plate 114, 0.015 inch thick, was secured to the pressure surface downstream of where the passageways 110 broke through the pressure surface. The plate extended upstream over what would otherwise have been the outlets of the passageways 110 at the pressure surface. The curvature of the pressure surface resulted in a narrow gap 116 between the pressure surface and the upstream portion of the plate 114, thereby defining slot outlets 118 at the upstream edge 120 of the plate. The plate redirects the flow from the passageways 110 in a direction substantially parallel to the pressure surface (θ is approximately 10°) at the slot outlets 118. The slot height h (at the slot outlet 118) was nominally 0.033 inch. The distance x from the leading edge point to the slot outlets was 0.2 inch, such that the ratio x/c was 1.2%.

Figure 5:
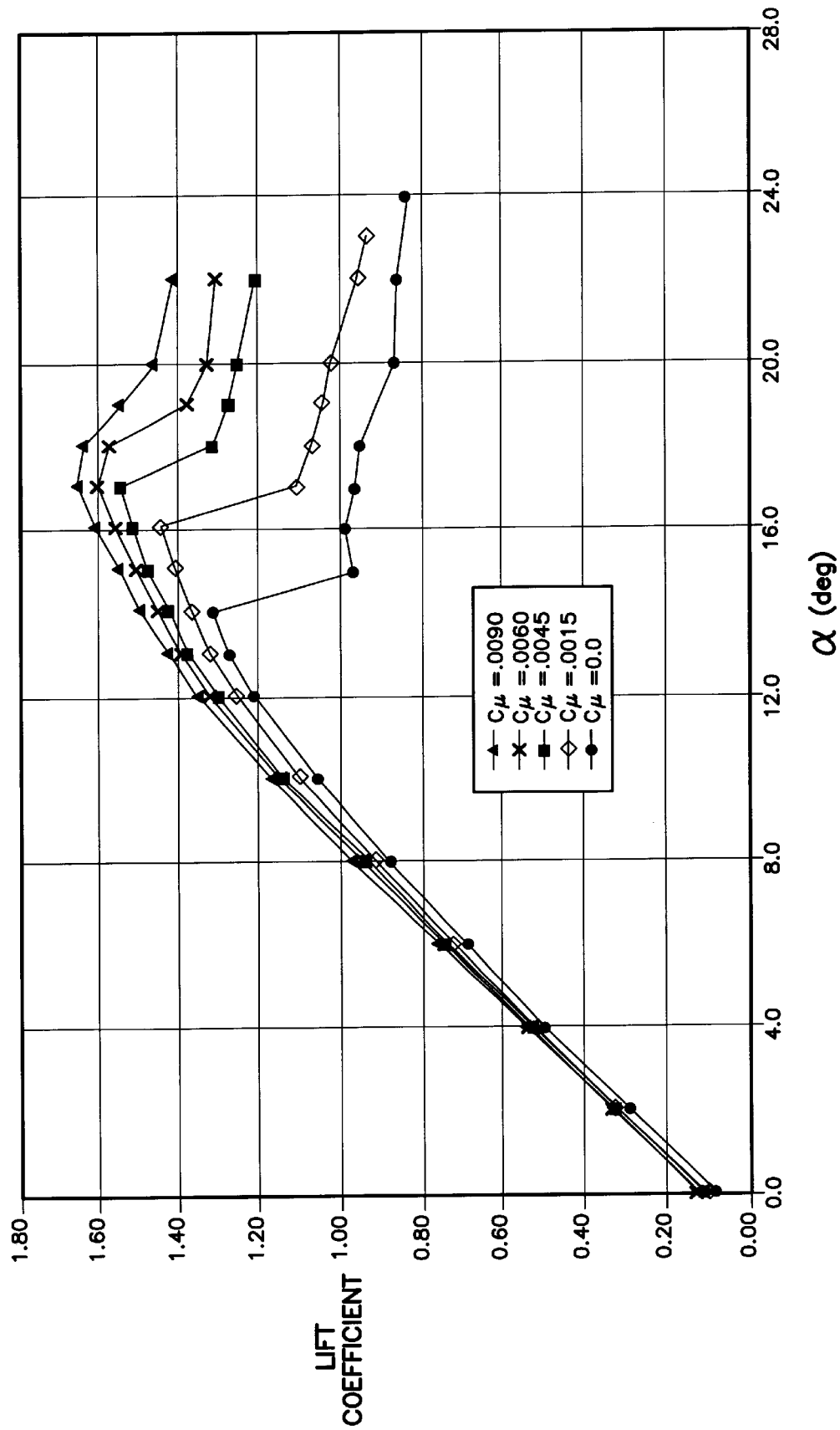
FIG. 5 is a graph of lift coefficient versus angle of attack, α, showing the performance improvements obtained during the testing of an airfoil, configured like the airfoil shown in FIG. 4, using different slot blowing rates as represented by lines of constant coefficient of momentum, $C_\mu$.

FIG. 5 is a graph showing the results of testing the airfoil 100 using several different momentum coefficients $C_\mu$ from 0.0 (no blowing) to 0.0090. For each $C_\mu$ the angle of attack θ was varied from 0° to at least 22°. To keep each momentum coefficient constant over the full range of angle of attack, the fluid supply pressure to the slots was varied. The free stream velocity $U_0$ was maintained constant at Mach 0.2. It is apparent from the graph that not only was the onset of stall delayed from an angle of attack of about 14° for the baseline configuration (no blowing) to almost 18° for $C_\mu$=0.0090, but for $C_\mu$=0.0090 the maximum lift coefficient prior to stall increased by more than 25%. At an α of 17° the airfoil generated 75% more lift than with no blowing. Additionally, as $C_\mu$ increased, the loss in performance during stall occurred more slowly (i.e., less suddenly). Note, also, that significant performance improvements were achieved for $C_\mu$=0.0015, which means that small blowing fluid flow rates can produce worthwhile results. Comparable improvements were realized using a freestream velocity of Mach 0.4. and a $C_\mu$ of 0.010.

Figure 6:
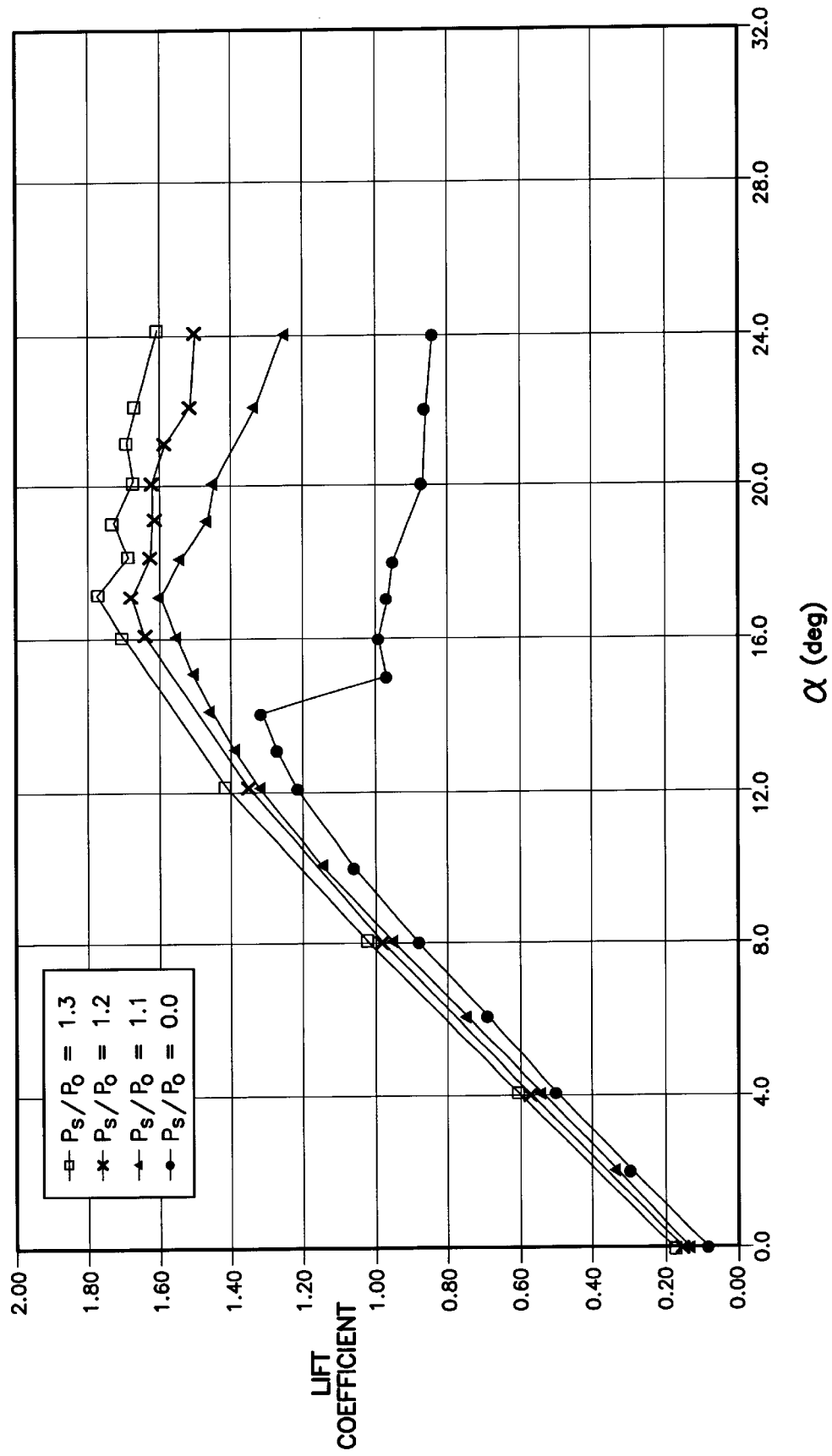
FIG. 6 is a graph of lift coefficient versus angle of attack, α, showing the performance improvements obtained during the testing of an airfoil, configured like the airfoil shown in FIG. 4, using different fluid supply pressures as represented by lines of constant supply pressure, $P_s/P_o$.

In another series of tests using the same airfoil 100, each test was conducted over a range of angles of attack, α, from 0° to 24°; but in each such test the ratio of blowing fluid supply total pressure, $P_s$, to freestream total pressure, $P_0$, was held constant. The graph of FIG. 6 shows the results of those tests for the baseline airfoil (no blowing) and for three different pressure ratios ($P_s/P_0$=1.1, 1.2, and 1.3). These tests also demonstrate the significant improvement in lift coefficient and the delay in the onset of stall, even for low blowing fluid supply pressures.

Figure 7:
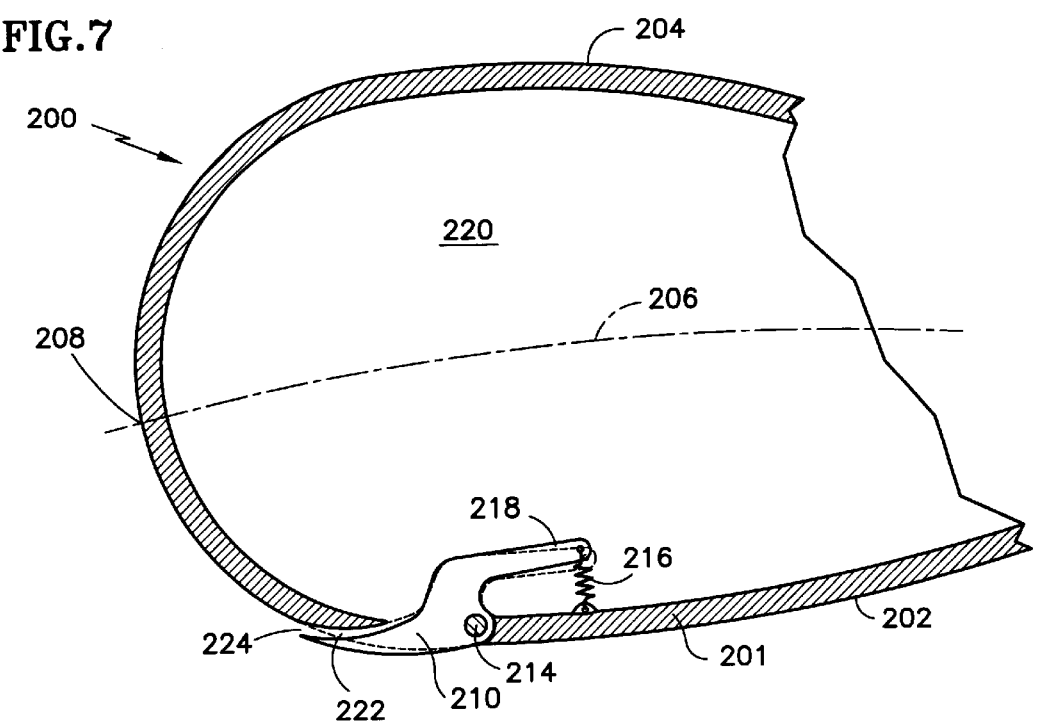
FIGS. 7, 8, and 9 are sectional views of the upstream portions of streamlined bodies incorporating various deployable slot configurations in accordance with the present invention.
Figure 8:
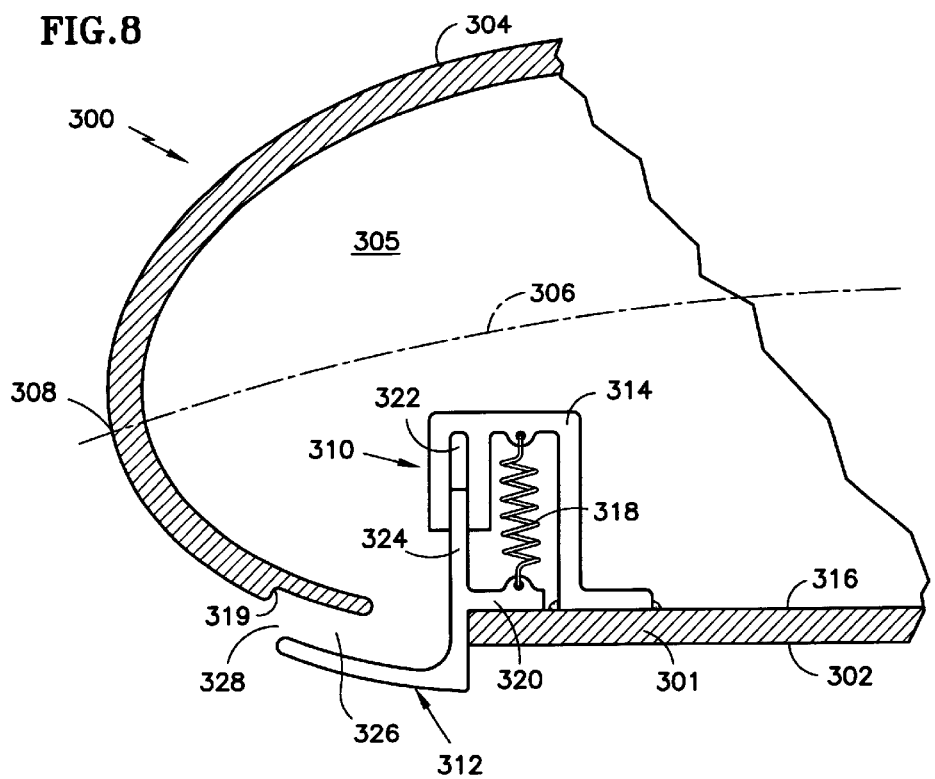
Figure 9:
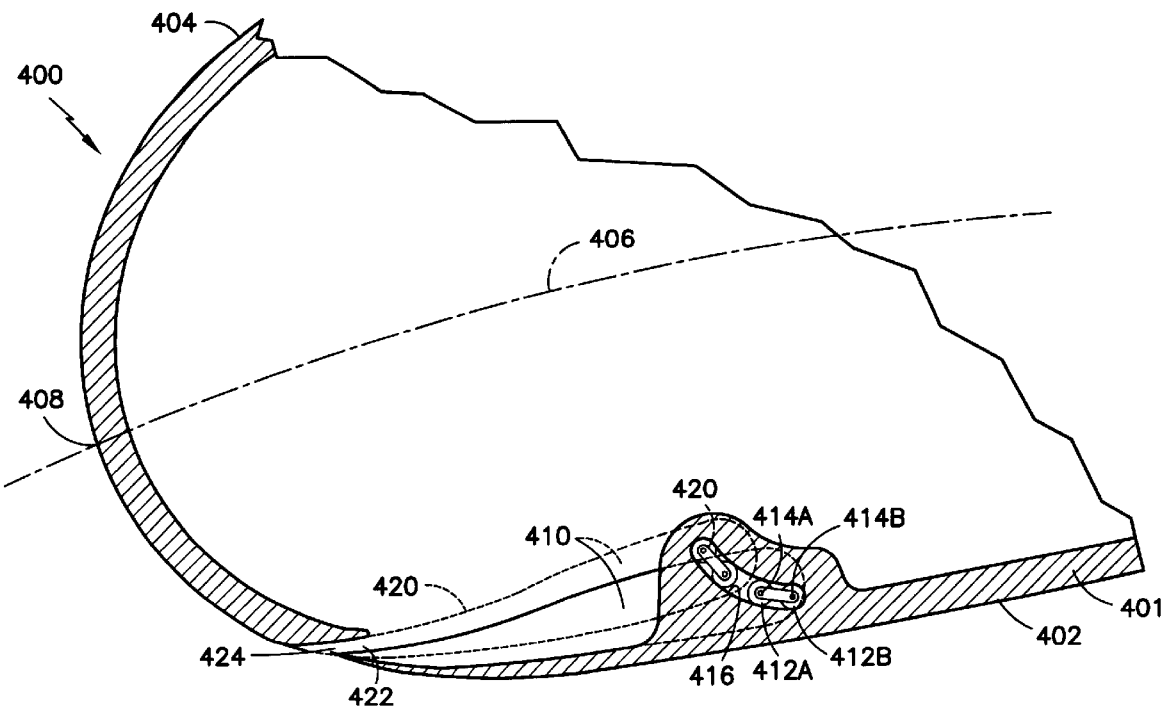

Alternate slot designs are depicted in FIGS. 7, 8, and 9 for airfoils 200, 300 and 400, respectively. The slots of those three figures are all deployable slots, in that the slot outlets may be opened during blowing and closed when no blowing is desired. When closed, undesirable turbulence on the surface of the airfoil near the slot outlets is minimized, as would be any drag due simply to the slot presence. Of course, instead of or in addition to deployable slots, apparatus could be readily provided to control the rate of blowing or to shut off the supply of pressurized fluid to the slots. Although one reason to use deployable slots is to minimize drag, it should be noted that, for the test configuration of FIG. 4, at α=0° and no slot blowing, there was no measurable drag penalty when compared to the same airfoil with no plate and no slots. Although the deployable slots of FIGS. 7–9 are shown as part of what are referred to as airfoils, these deployable slots may be used with any streamlined bodies having the room to accommodate them, such as, but not limited to, nacelles and aircraft wings.

FIG. 7 depicts, in cross-section, the upstream portion of a hollow airfoil 200 similar to the airfoil of FIGS. 1–3, but with an alternate means for forming the blowing slots. The airfoil has a wall 201 defining a pressure surface 202 and a suction surface 204. The phantom line 206 represents the mean camber line of the cross-section shown. The leading edge point of the cross-section shown in the drawing is the point 408 where the mean camber line intersects the leading edge region of the external surface. In this embodiment, the airfoil includes a flap 210 hinged to the airfoil wall 201 for rotation about an axis 214. A spring 216 has one of its ends attached to an arm 218 of the flap, and has its other end attached to the wall 201. The spring is biased to keep the flap closed until the pressure in the cavity 220 is increased to a certain level, which would occur when slot blowing was desired by using appropriate pressure control means (not shown). Upon overcoming the spring resistance, the flap rotates counterclockwise to form a slot 222 having an outlet 224. The flap 210 includes a stop mechanism (not shown) that limit its counterclockwise rotation to assure the proper slot outlet height. When open, pressurized fluid in the cavity 220 is blown from the slot 222 at a shallow angle to the surface 202 at the slot outlet 224. The slot-closed position is shown in phantom. In the slot-closed position the flap 210 blends smoothly with the external pressure surface 202.

FIG. 8 shows yet another deployable slot design. In FIG. 8 the hollow airfoil 300 is defined by a wall 301 having a pressure surface 302 and a suction surface 304. The airfoil has a pressurizable cavity 305. The phantom line 306 represents the mean camber line of the airfoil cross-section shown; and the leading edge point of the airfoil cross-section is the point 308 where the mean camber line intersects the leading edge region of the airfoil external surface.

Still referring to FIG. 8, the airfoil 300 includes a "pop-up" slot assembly represented by the reference numeral 310. The slot assembly 310 comprises a flap 312, a guide 314 secured (such as by welding) to the internal surface 316 of the wall 301, and a spring 318, secured at one of its ends to the guide 314 and at the other of its ends to a spring support arm 320 of the flap 312. The guide 314 includes a guide channel 322. A guide arm 324 of the flap 312 extends into the guide channel 322. The flap is moveable within the guide channel in a direction substantially perpendicular to the wall surface 316 where the flap is located. In the drawing the flap is shown in solid lines in its deployed position and in phantom in its closed position. The spring 318 is biased to keep the flap closed until the pressure in the cavity 305 is increased to a certain level, which would occur when slot blowing was desired by using appropriate pressure control means (not shown). When closed the flap rests in a groove 319 in the surface 302 for smooth external flow over the airfoil. When the cavity pressure overcomes the spring resistance, the flap slides to its open position forming a slot 326 having an outlet 328 for directing pressurized fluid at a shallow angle to the airfoil surface 302 at the slot outlet 328. In the deployed position the spring support arm 320 acts as a stop. A seal is disposed between the arm 320 and the wall surface 316 to prevent pressurized fluid from exiting the cavity other than through the slot 326.

In another embodiment shown in FIG. 9, a hollow airfoil 400 has a wall 401 defining a pressure surface 402 and a suction surface 404. The phantom line 406 represents the mean camber line of the cross-section shown. The leading edge point of the airfoil cross-section is the point 408 where the mean camber line intersects the leading edge region of the airfoil external surface. The airfoil 400 includes a curved panel 410 to which is attached at least one pair of tandem rollers 412A, 412B, each of which rotates about its own axis 414A, 412B, respectively. The roller axes are fixed relative to the panel 410; and the rollers ride on a curved track 416 that is fixed relative to the wall 401. A suitable linkage mechanism, not shown, moves the panel 410 and the rollers along the track 416 between the deployed slot-open position shown in solid lines, and the slot-closed position shown in dotted lines. The curvature and orientation of the track 416 and the shape of the panel is such that the panel forms a substantially smooth external airfoil pressure surface when in the slot-closed position. In the deployed or slot-open position a curved slot 422 (i.e. curved in the plane of the paper) is formed having an outlet 424. The curved slot directs pressurized fluid upstream over the airfoil pressure surface toward the leading edge line at a shallow angle to the surface.

Figure 10:
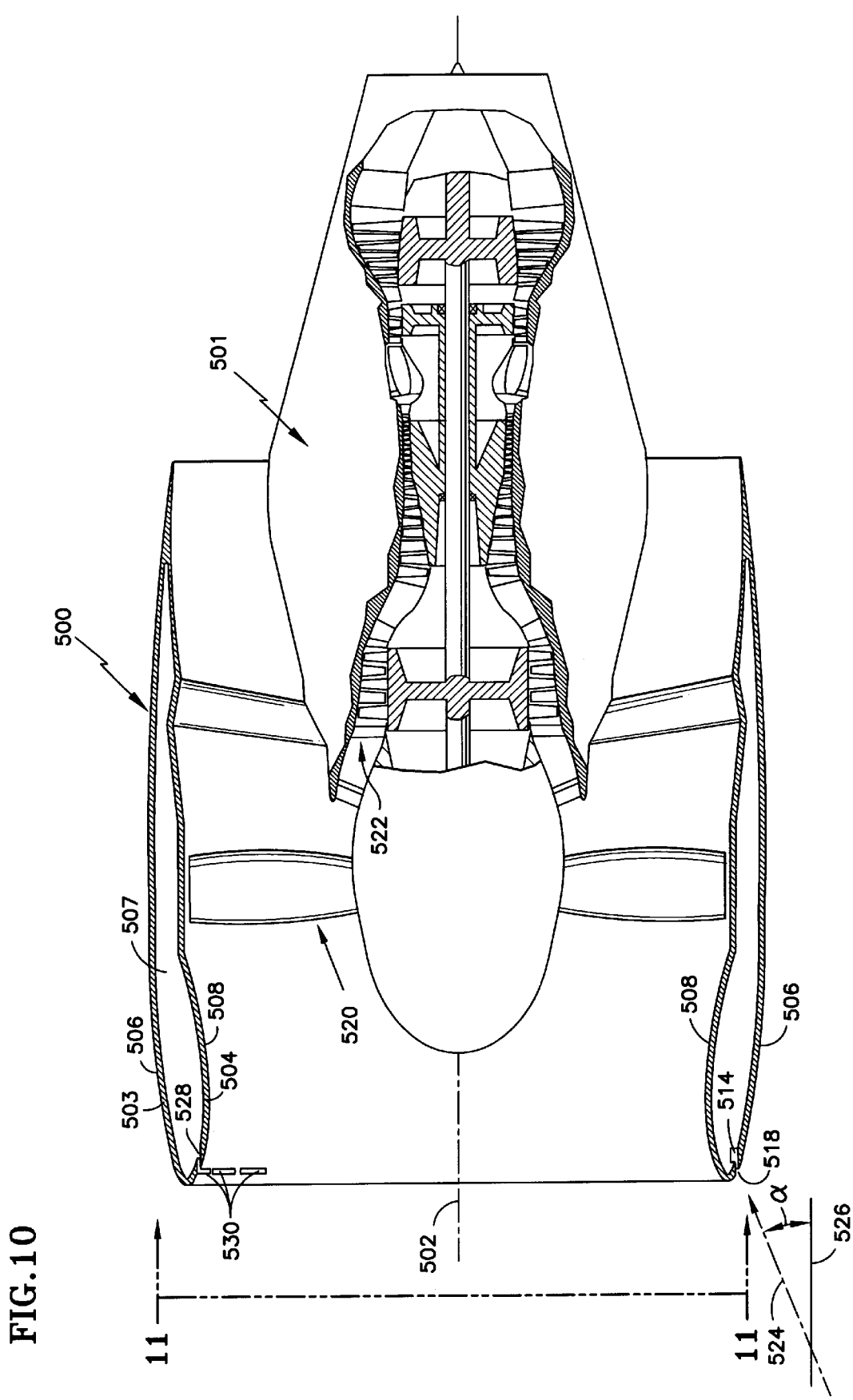
FIG. 10 is a sectional view of a gas turbine engine surrounded by a nacelle incorporating the blowing slots of the present invention.
Figure 11:
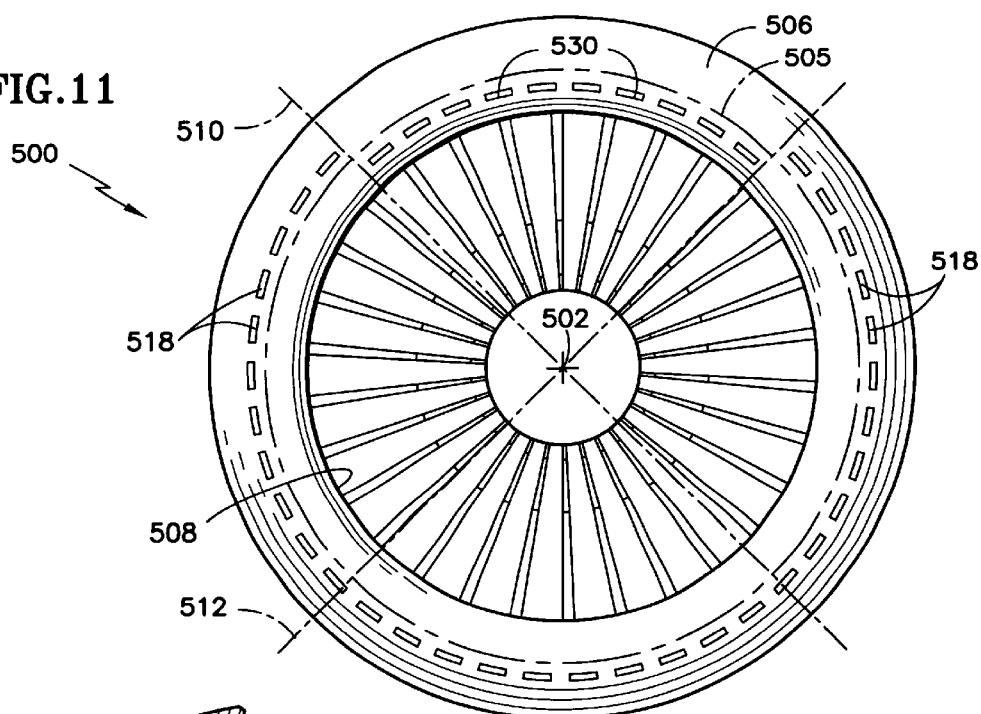
FIG. 11 is a front view of the engine and nacelle of FIG. 10, taken in the direction 11—11 of FIG. 10.

FIGS. 10 & 11 show the present invention incorporated into a nacelle 500 surrounding a gas turbine engine 501 having an axis 502. An airfoil shaped cross-section of the nacelle can be seen both above and below the engine axis, which, in this embodiment, is also the nacelle axis. Although some asymmetry usually exists in engine nacelles, for simplicity and ease of explanation, the shape of the nacelle may be considered to be formed by rotating the airfoil cross-section about the axis 502. The nacelle 500 comprises a circumferentially extending external wall 503 and a circumferentially extending internal wall 504, which join together to define a pressurized cavity 507. The nacelle has a leading edge line 505 (see FIG. 11) that is a line extending circumferentially about the engine axis and formed by the locus of leading edge points on the nacelle cross-sections. The external wall 503 has a radially outwardly facing surface 506; and the internal wall 504 has a radially inwardly facing surface 508. Although the primary function of an engine nacelle is not to create lift, during cruise and other low angle of attack conditions the inwardly facing surface 508 is a pressure surface, and the outwardly facing surface 506 is a suction surface. For purposes of later discussion, the engine and nacelle front view of FIG. 11 shows the engine divided, by phantom lines 510 and 512, into left and right and upper and lower quadrants.

The main purposes of aircraft engine nacelles is to reduce drag and to maintain, to the extent possible under a variety of conditions, a circumferentially undistorted flow of air into the fan 520 and the low pressure compressor 522. Distortion worsens engine performance, and, in the extreme, can cause the engine to stall. If cruise were the only flight condition, nacelles could be relatively short and have a thin airfoil shaped cross-section; however, to accommodate high angles of attack (such as during takeoff) and cross-winds, nacelles must usually extend a fair distance upstream of the engine inlet and have a relatively thick inlet lip (i.e. a relatively thick nacelle leading edge region). This adds undesirable weight and expense. As explained below, the present invention may be used to reduce the nacelle length and inlet lip thickness.

During takeoff and other high angle of attack situations the free stream air (represented by the arrow 524 in FIG. 10) strikes the lower quadrant of the nacelle from the lower left of FIG. 11 at an angle $\alpha$ (relative to the line 526 which is parallel to the axis 502), which could be 25° or more. Under those circumstances the external surface 506 of the nacelle over the lower quadrant becomes the pressure surface; and the internal surface 508 over the lower quadrant becomes the suction surface. Similarly, cross-winds from the left (in FIG. 11) can, if the aircraft forward speed is sufficiently slow (such as during take-off), result in the external surface 506 of the left quadrant becoming the pressure surface and the internal surface 508 of the left quadrant becoming the suction surface. Cross-winds from the right obviously have an analogous effect on the right quadrant.

In accordance with the present invention, blowing slots 514 (FIG. 10) are located circumferentially around the nacelle through the outer wall 503 of the left, right and lower quadrants of the nacelle. The slots are shaped and oriented to direct pressurized fluid from the cavity 507 upstream toward the leading edge line at a shallow angle to the external surface 506, which is a pressure surface over the lower quadrant during the high angles of attack often seen during take-off and over the left or right quadrant when cross winds create a distortion problem. The slot outlets 518 (FIG. 11) extend circumferentially about the nacelle axis, concentric with and spaced radially inwardly from the leading edge line 505.

The blowing slots 514 of the present invention reduce distortion under take-off and cross-wind conditions, thus permitting greater angles of attack without stall and with less performance degradation, and/or minimizing or avoiding engine performance degradation (such as stall) with high cross winds. Alternatively, or simultaneously, the nacelle may be made thinner and shorter without compromising engine performance. An important additional benefit of the present invention, as applied to nacelles, is that the fan and/or low pressure compressor blades may be better designed for operation at cruise because they would need to accommodate less or no distortion under other more stressful flight conditions.

Another flight condition for which the present invention is useful is the "single-engine-out climb" situation, that occurs when an engine stalls during climb (e.g. take-off), and the pilot decides to continue the climb using the remaining engine(s). In that situation, the nacelle drag over the radially outwardly facing surface 506 of the upper quadrant increases substantially due to flow separation. This separation is caused by the dramatic shift in incoming flow due to non-operability of the engine and the associated spillage of flow around the nacelle inlet. Since the engines must be sized to enable completion of take-off during a single-engine-out situation, reducing the drag could result in a lower thrust requirement for the engine, which would have several beneficial consequences.

To reduce drag under single-engine-out climb conditions the nacelle 500 includes blowing slots 528 through the inner wall 504. The slots 528, which extend circumferentially about the upper quadrant of the nacelle 500, have their outlets 530 at the radially inward facing nacelle surface 508. During single-engine-out climb, that quadrant of the surface 508 is a pressure surface.

Although not shown in this simplified drawing, the slots 514 or 528 within each nacelle quadrant are preferably opened and closed independently of the slots within the other quadrants, such as by using deployable slots or by other suitable means. Thus, during high angles of attack portions of normal take-off, only the slots of the lower quadrant are opened. When crosswinds from the left are strong enough to create a problem, the slots within the left quadrant are opened. During a single-engine-out climb the slots 528 in the upper quadrant are opened, and so forth.

Figure 13:
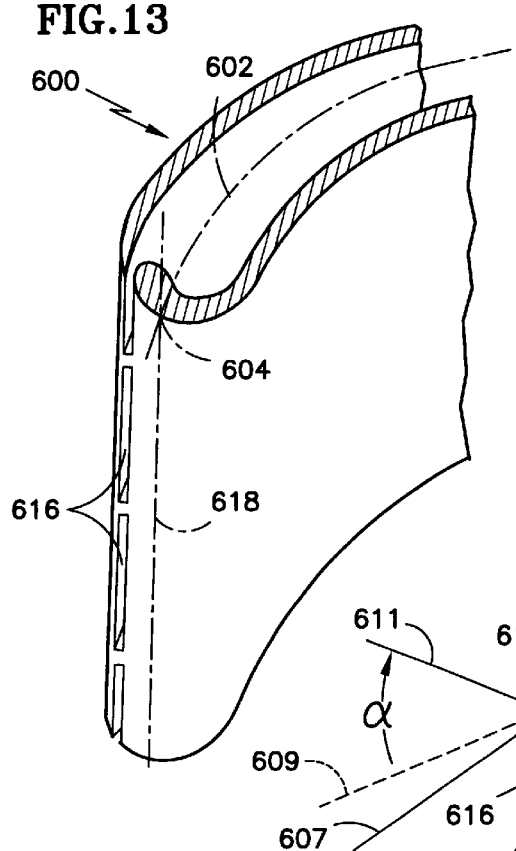
FIG. 13 is a perspective view of the vane of FIG. 12, taken generally in the direction 13—13 of FIG. 12.
Figure 12:
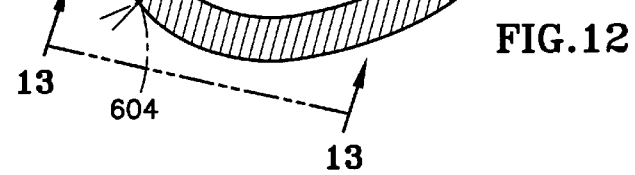
FIG. 12 is a sectional view of the upstream portion of a turbine exit guide vane incorporating the blowing slots of the present invention.

FIGS. 12 and 13 show views of a portion of a gas turbine engine guide vane 600 incorporating the present invention. As best shown in FIG. 12, the vane cross-section mean camber line, designated by the reference numeral 602, intersects the leading edge region at the leading edge point 604. The mean chord line is designated by the reference numeral 606. During most of the vane's operating regime, and under normal operating conditions, the vane sees the flow approaching generally from the lower left direction, as designated by the arrow 607. Those conditions are referred to herein as the primary operating conditions. The direction of $\alpha=0°$ is represented by the dotted line 609, which is parallel to the mean chord line 606. The shape and orientation of the vane 600 is selected for high performance during primary operating conditions. During primary operating conditions the vane suction surface is the upper surface 608, and the vane lower surface is the pressure surface 610. The vane performs well under primary operating conditions, without any slot blowing.

Under certain limited circumstances, the angle of attack ($\alpha$) of the incoming flow against the vane 600 is a negative angle. In such situations the flow approaches the vane 600 generally from the upper left, as represented by the arrows 611. Under those conditions the surface 608 becomes the pressure surface and the surface 610 becomes the suction surface. To minimize performance losses and avoid stall under those conditions, the vane wall 612 includes slots 614 therethrough having outlets 616 at the surface 608 and extending along the span of the vane substantially parallel to the leading edge line 618 (FIG. 13). The slots are located and shaped to blow pressurized air from within the vane cavity 620 upstream toward the leading edge line, at a shallow angle to the surface 608. The distance of the slot outlets from the leading edge line and the slot dimensions are selected according to criteria previously discussed herein. The slots would only become operational when α is sufficiently negative such that the surface 608 becomes the pressure surface and the vane would otherwise perform poorly. This could be done using appropriate controls and valves (not shown) to pressurize the vane cavity 620 at the appropriate time; or, deployable slots, as previously described, could be used. In this embodiment the use of slot blowing when conditions are less than optimal allows the vane to be designed to perform better under normal operating conditions.

Although the invention has been described and illustrated with respect to exemplary embodiments thereof, it should be understood by those skilled in the art that the foregoing and various other changes, omissions and additions may be made without departing from the spirit and scope of the invention.

What is claimed is:

1. A streamlined body including wall means having a first external surface and a second external surface, wherein said first and second surfaces meet to define a leading edge line, said body having at least one passageway therewithin adapted to carry a pressurized fluid, said passageway having an outlet at said first surface and being configured and arranged to direct pressurized fluid from said outlet toward said leading edge line at a shallow angle to said first surface at said outlet.

2. The streamlined body according to claim 1, wherein said passageway is a slot elongated in the direction of the leading edge line.

3. The streamlined body according to claim 2, wherein said wall means defines a pressurizable cavity within said body, and said passageway has an inlet communicating with said cavity.

4. The streamlined body according to claim 3, wherein cross-sections of said body taken perpendicular to said leading edge line are airfoil shaped, each having a mean chord line, wherein the distance from said slot outlets to said leading edge line in respective cross-sections, as measured in the direction of the mean chord line, is between 0.25% and 5.0% of the mean chord line length.

5. The streamlined body according to claim 3, wherein said shallow angle is no greater than 30°.

6. The streamlined body according to claim 5, wherein the body is a gas turbine engine airfoil.

7. The streamlined body according to claim 3, wherein the body is a helicopter blade and said shallow angle is no greater than 30°.

8. The streamlined body according to claim 1, wherein the body is a nacelle, and said shallow angle is no greater than 30°.

9. The nacelle according to claim 8, wherein said nacelle has an axis, and said first surface is a radially outwardly facing surface extending circumferentially about said axis, and said second surface is a radially inwardly facing surface extending circumferentially about said axis, and said at least one passageway are a plurality of slots extending circumferentially about said axis.

10. The airfoil according to claim 6, wherein said first surface is the airfoil pressure surface.

11. The airfoil according to claim 6, wherein said first surface is the airfoil suction surface during primary operating conditions.

12. The streamlined body according to claim 4, including means for opening and closing said slots.

13. The streamlined body according to claim 4, wherein said slots are deployable slots.

14. An airfoil comprising first wall means having an external surface and second wall means having an external surface, one of said surfaces being a pressure surface and the other being a suction surface, said pressure and suction surfaces blending together to define a spanwise extending leading edge region including a leading edge line, said airfoil including a cavity therewithin adapted to receive pressurized fluid, said airfoil including means defining one or more spanwise extending slots through said first wall, said slots having inlets adapted to communicate with pressurized fluid within said cavity, said slots having outlets at said first surface and located a distance from said leading edge line that is between 0.5% and 3.0% of the airfoil chord length at the spanwise location of said slot, said slot defining means configured and arranged to direct pressurized fluid over said first surface toward said leading edge line at an angle of no greater than 30° to said first surface at said slot outlet.

15. The airfoil according to claim 14, wherein said first surface is the airfoil pressure surface.

16. A method for improving the performance of a streamlined body having an airfoil shaped cross-section, said body having a first external surface and a second external surface that blend together to form a leading edge region, said region including a leading edge line, said method including the step of blowing pressurized fluid from within the body over the first external surface at a shallow angle to the first surface in a direction toward the leading edge line, the fluid being injected with sufficient momentum and at a sufficiently shallow angle such that the fluid travels over the first surface and around the leading edge region to the second surface while remaining attached to the airfoil, energizing the boundary layer on the second surface.

17. The method according to claim 16, wherein the body is a nacelle surrounding a gas turbine engine and said first surface is the circumferentially extending, radially outwardly facing surface of the nacelle, and said step of blowing over the first surface at a shallow angle includes blowing over the lower quadrant of the first surface of the nacelle during take-off or climb to reduce distortion of the air flow entering the engine caused by a high angle of attack.

18. The method according to claim 16, wherein the body is a nacelle surrounding a gas turbine engine and said first surface is the circumferentially extending, radially outwardly facing surface of the nacelle, and said step of blowing over the first surface at a shallow angle includes blowing over the left or right quadrant of the first surface of the nacelle during take-off to reduce distortion of the air flow entering the engine caused by cross-winds.

19. The method according to claim 16, wherein the body is a nacelle surrounding a gas turbine engine and said first surface is the circumferentially extending, radially inwardly facing surface of the nacelle, and said step of blowing over the first surface at a shallow angle includes blowing over the upper quadrant of the first surface of the nacelle during single-engine-out operation to reduce drag over the radially outwardly facing surface of the nacelle.

20. A method for energizing the boundary layer on the suction surface of an airfoil having a leading edge region and a leading edge line, comprising blowing pressurized fluid from the pressure surface to the suction surface around the leading edge region, said step of blowing comprising blowing the pressurized fluid toward the leading edge line at a shallow angle to the pressure surface from span-wise extending slot outlets at the pressure surface.

* * * * *